Feb. 17, 1970 — L. J. BISHOP — 3,495,547
ACCUMULATING TOW TRUCK
Filed March 24, 1967 — 2 Sheets-Sheet 1
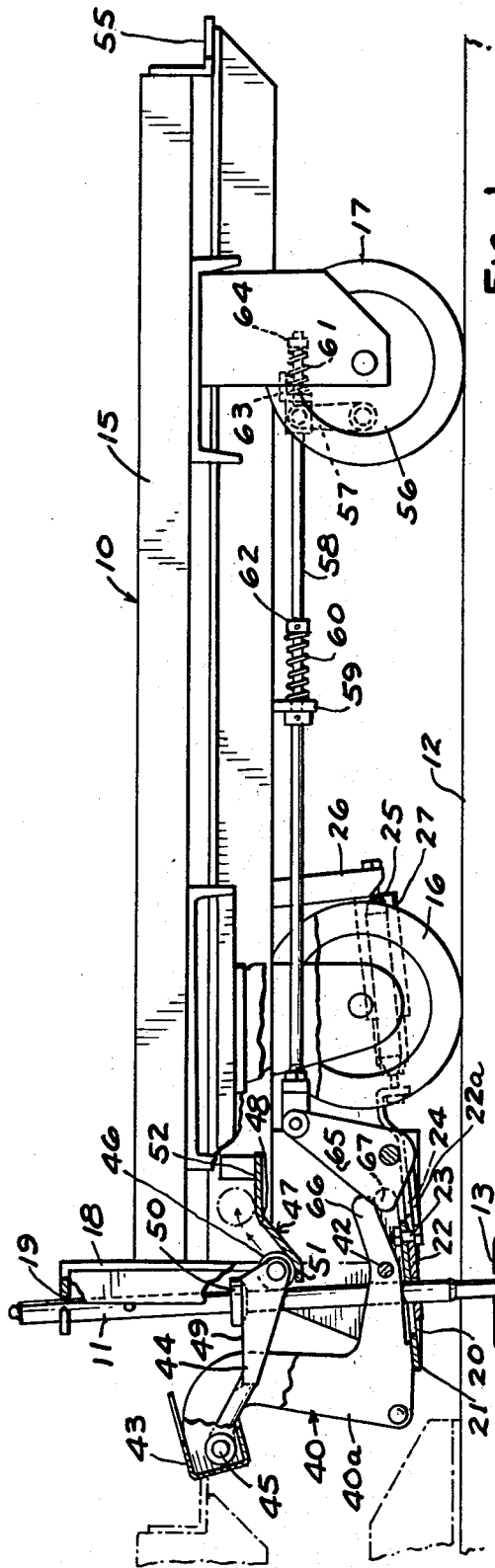
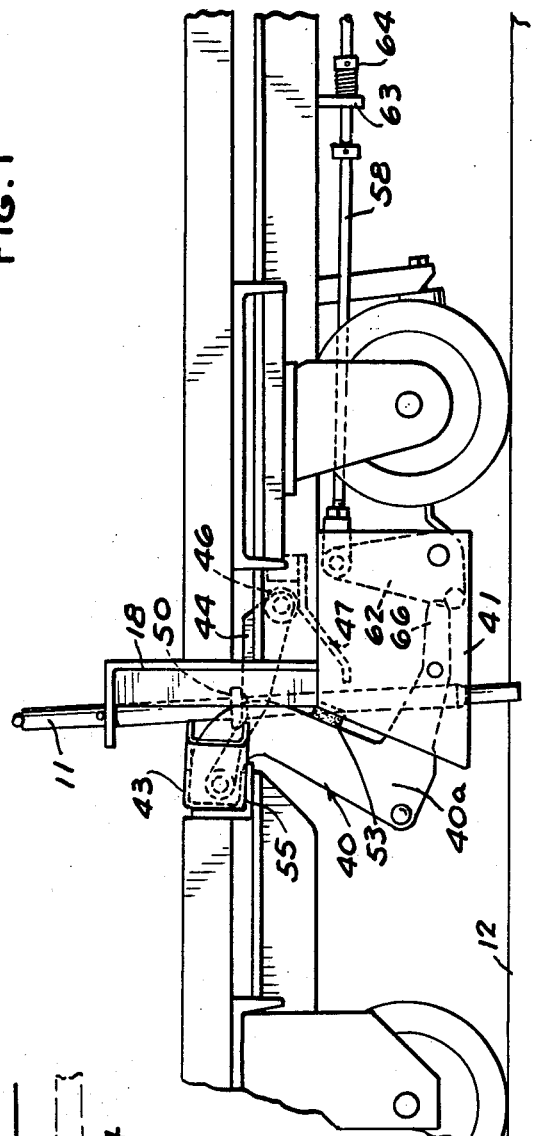
INVENTOR.
LEONARD J. BISHOP
BY
Barnes, Kisselle, Raisch & Choate
ATTORNEYS

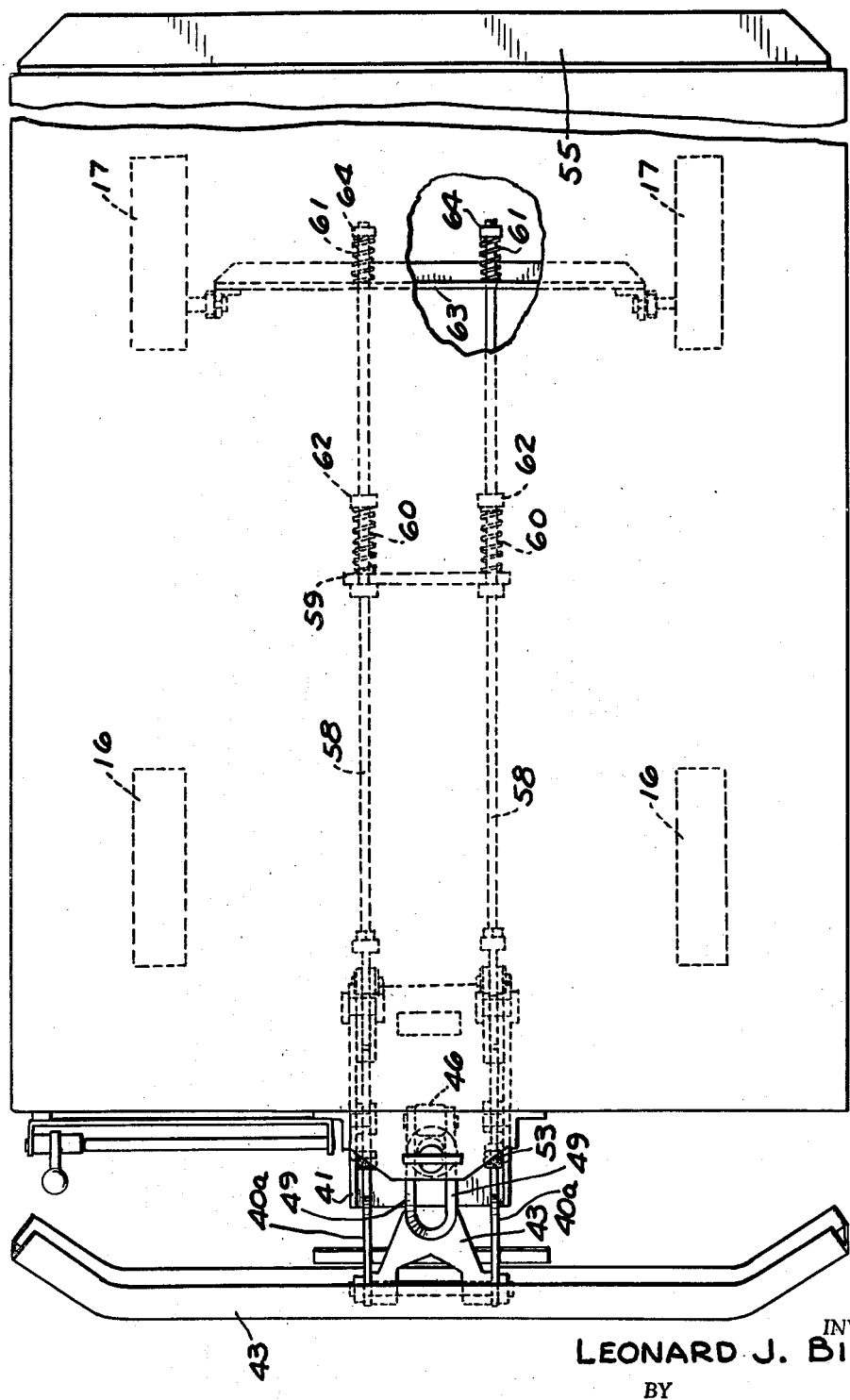

United States Patent Office 3,495,547
Patented Feb. 17, 1970

3,495,547
ACCUMULATING TOW TRUCK
Leonard J. Bishop, Birmingham, Mich., assignor, by mesne assignments, to American Chain & Cable Company, Inc., New York, N.Y., a corporation of New York
Filed Mar. 24, 1967, Ser. No. 625,760
Int. Cl. B61b *13/00;* B61c *11/02*
U.S. Cl. 104—172                                          16 Claims

ABSTRACT OF THE DISCLOSURE

The tow truck conveyor system disclosed herein comprises a floor which has a slot therein beneath which a conveyor is moved. One or more wheeled tow trucks are provided and have downwardly extending tow pins that extend through the slot into engagement with lugs on the conveyor to move the tow trucks. A bumper is pivoted on the front end of the tow truck and is operatively connected to the tow pin to lift the tow pin when the bumper engages a preceding truck or other obstacle. A brake is associated with certain wheels of the tow truck and is operated by the bumper upon engagement with an obstacle to stop the tow truck. The mechanism for lifting the tow pin is arranged in such a manner as to permit some longitudinal movement of the lower end of the tow pin and thereby accommodate shock on the tow pin due to engagement and disengagement of the tow pin with the conveyor. Specifically, a link is pivoted to the bumper at its forward end and has its rear end formed with a cam follower engaging a cam which is shaped in such a manner as to maintain the link in substantially parallel relation as the bumper is pivoted upon engagement with an obstacle. The tow pin is, in turn, engaged by the link to elevate the pin as the bumper is moved rearwardly.

---

This invention relates to tow truck conveyor systems and particularly to accumulating type tow truck conveyor systems.

Background of the invention

In tow truck conveyor systems and the like, the wheeled tow truck is positioned along the floor and has a tow pin that extends downwardly through a slot in the floor into engagement with a lug on a power driven conveyor. It is old in the art to provide a movable bumper that is adapted to lift the tow pin out of engagement with the conveyor in the event the tow truck encounters a preceding truck or obstacle as shown in the patent to Botley 2,234,620, issued Mar. 11, 1941.

In the patent to Paul Klamp 3,015,284, issued Jan. 2, 1962, there is disclosed and claimed the concept of yieldingly mounting the lower end of the tow pin in a manner to absorb shock on the tow pin when the tow pin is reengaged by a pusher on the conveyor.

Among the objects of the present invention are to provide a tow truck wherein the lifting of the tow pin is achieved without interfering with the longitudinal movement of the lower end of the tow pin as required in order to provide the shock absorbing characteristics; a tow truck which is relatively simple and low in cost; and a tow truck which further includes a novel brake operating system.

Summary

The tow truck conveyor system disclosed herein comprises a floor which has a slot therein beneath which a conveyor is moved. One or more wheeled tow trucks are provided and have downwardly extending tow pins that extend through the slot into engagement with lugs on the conveyor to move the tow truck. A bumper is pivoted on the front end of the tow truck and is operatively connected to the tow pin to lift the tow pin when the bumper engages a preceding truck or other obstacle. A brake is associated with certain wheels of the tow truck and is operated by the bumper upon engagement with an obstacle to stop the tow truck. The mechanism for lifting the tow pin is arranged in such a manner as to permit some longitudinal movement of the lower end of the tow pin and thereby accommodate shock on the tow pin due to engagement and disengagement of the tow pin with the conveyor. Specifically, a link is pivoted to the bumper at its forward end and has its rear end formed with a cam follower engaging a cam which is shaped in such a manner as to maintain the link in substantially parallel relation as the bumper is pivoted upon engagement with an obstacle. The tow pin is, in turn, engaged by the link to elevate the tow pin as the bumper is moved rearwardly.

Description of the drawings

FIG. 1 is a part sectional side elevational view of a tow truck conveyor system embodying the invention.

FIG. 2 is a fragmentary view similar to FIG. 1 showing two tow trucks in accumulated position.

FIG. 3 in a fragmentary plan view of the tow truck shown in FIG. 1.

Description

Referring to FIGS. 1 and 3, the tow truck 10 has a tow pin 11 vertically mounted on the front end thereof and adapted to extend through a slot 12 in the floor into engagement with a pusher lug 13 on a conveyor chain 14 that is driven by a source of power which is not shown. The truck 10 includes a body 15 having caster wheels 16 adjacent the front end thereof and rear wheels 17 mounted about fixed transverse axes adjacent the rear end thereof.

The tow pin 11 is mounted at it upper end by an arrangement which includes a bracket 18 having an opening 19 through which the tow pin 11 extends. The lower end of the tow pin extends through an elongated slot 20 in a bracket 21 and through a reciprocable bar 22 that is mounted on the bracket 21 for sliding movement by an arrangement which includes a bolt 23 that extends through an elongated slot 24 in the plate 22. Guides 22a are preferably provided on bracket 21 to guide the bar 22 and permit only longitudinal movement thereof.

A strong coil spring 27' connects the rear end of the plate 22 to a bracket 26 on the truck body, thus yieldingly urging the lower end of the tow pin 11 rearwardly through the plate 22. A shock absorber 27 is also associated with the plate 22 to control the rate of return of plate 22 and prevent acceleration of the truck due to buildup of force in spring 27'. As the lower end of the tow pin 11 is engaged by the conveyor lug 13, it is swung forwardly relative to the truck under the yielding resistance of the spring 25. Such an arrangement is more clearly shown and described in the patent to Klamp 3,015,284, issued Jan. 2, 1962.

A bumper assembly 40 is pivoted to a bracket 41. Bumper assembly comprises L-shaped brackets. A pivot pin 42 extends through one leg of the bumper arms to pivot the bumper assembly to the bracket 41. A transversely extending channel shaped bumper 43 is fixed to the upper leg of the bracket 40a. A link 44 is pivoted at 45 within the bumper 43 and extends generally horizontally and rearwardly. A cam follower roller 46 on the rear end of link 44 engages a cam 47 on the truck body. The cam 47 has the major portion 48 thereof extending at an angle to the horizontal and vertical. The slope of the surface of the portion 48 lies substantially tangent to a circle having as its center the pivot pin 42. Link 44 includes an opening elongated in a direction longitudinally of the truck body through which the tow pin 11 extends.

Bevelled surfaces 49 of the opening are engaged by the lower conical surface of a collar 50 on the tow pin (FIG. 3).

When the tow pin 11 is in its lowermost position in engagement with the lug 13, the roller 46 engages a short forwardly extending horizontal portion 51 on the cam 47. When the bumper 43 encounters a preceding tow truck or an obstacle, the bumper 43 is pivoted upwardly and rearwardly causing the cam follower 46 to follow the cam 47 and thereby lift the link 44 and, in turn, the tow pin 11. The tow pin 11 is elevated until the rollers 46 engage a rearwardly extending horizontal portion 52 on cam 47. Portion 52 permits overtravel to insure elevation of the tow pin. A stop 53 is provided and is engaged by the bumper to limit the rearward movement.

By making the slope of the major portion 48 of the cam 47 such that it has substantially the same center of curvature as the pivot of the bumper 43, the link 44 is maintained in substantially parallel relationship as it is moved vertically. By maintaining the link 44 in substantially parallel relationship, the tow pin is lifted without binding and the lower end of the tow pin is permitted to move longitudinally of the truck in order to cause the shock absorbing system associated with the tow pin to be effective.

As shown in FIGS. 1–3, the rear end of the truck is provided with a horizontal ledge 55 that is engaged by the bumper 43 and upon which the bumper 43 rests to prevent dropping of the tow pin as long as the preceding tow truck is stopped.

A brake system is associated with the operation of the bumper and includes a brake 56 in each rear wheel that is operated by a lever 57. Each lever 57 in turn is operated by a rod 58 that is supported for movement longitudinally on a bracket 59 on the truck body.

A spring 60 is interposed between an abutment 62 on each rod 58 and the bracket 59. A spring 61 is interposed between an abutment 64 on each rod 58 and a common actuating bar 63 on the rod 58. The springs normally urge the brakes out of engagement. The forward end of each rod 58 is pivoted to a crank 65 that in turn is pivoted to the bracket 41. A projection 66 on the lower arm of each bracket 40a engages a projection 67 on the crank 65 to rotate the crank 65 in a counterclockwise direction as the bumper is moved by engagement with an obstacle and thereby move its rod 58 respectively forwardly to engage the respective brake.

I claim:
1. In a tow truck, the combination comprising
a body adapted to be moved along a floor or the like,
a tow pin,
said tow pin being mounted for generally vertical reciprocation on said body,
at least the lower end of said tow pin being movable longitudinally of said body,
a bumper,
means for pivoting said bumper on said body, and
means between said bumper and said body operable upon pivotal movement of said bumper to elevate said tow pin while permitting longitudinal movement of the lower end of said tow pin,
said last mentioned means being operable to elevate the tow pin to a predetermined position after which additional movement of the bumper does not elevate the tow pin,
said last mentioned means comprising a link pivoted at one end to said bumper,
a cam on said body,
said link having a cam follower thereon engaging said cam,
said tow pin having a portion thereof engaging said link,
the major portion of the surface of said cam which is contacted by said cam follower being substantially parallel to the path of movement of the pivot of said link to said bumper whereby successive positions of said link are substantially parallel to the original position as the bumper is pivoted.

2. The combination set forth in claim 1 including a stop on said body engaged by said link for limiting the pivotal movement of said bumper.

3. In a tow truck, the combination comprising
a body adapted to be moved along a floor or the like,
a tow pin,
said tow pin being mounted for generally vertical reciprocation on said body,
at least the lower end of said tow pin being movable longitudinally of said body,
a bumper,
means for pivoting said bumper on said body,
a link pivoted at one end to said bumper, and
means interconnecting said link and said body and operable upon pivotal movement of said bumper due to engagement with an obstacle to move said link in a manner such that it is maintained in substantially parallel relationship to its original position,
said tow pin having a portion thereof engaging said link whereby as the link is moved vertically, said tow pin is moved vertically while permitting longitudinal movement of the lower end of the tow pin.

4. The combination set forth in claim 3 wherein said truck includes a rearwardly extending portion adapted to engage the underside of the bumper of a succeeding tow truck to hold said bumper in its pivoted position elevating said tow pin until the tow truck has moved away from said succeeding tow truck.

5. The combination set forth in claim 3 including shock absorbing means associated with said tow pin for yieldingly resisting said longitudinal movement of the lower end of said tow pin.

6. The combination set forth in claim 3 wherein said interconnecting means comprises a cam on said body,
said link having a cam follower thereon engaging said cam,
the surface of said cam being substantially parallel to the path of movement of the pivot of said link to said bumper whereby said link is maintained in substantially parallel relationship as the bumper is pivoted.

7. The combination set forth in claim 6 including a stop on said body for limiting the pivotal movement of said bumper.

8. The combination set forth in claim 6 wherein said cam includes a surface extending rearwardly from said first mentioned surface and permitting overtravel for the cam follower.

9. The combination set forth in claim 3 including wheels on said body,
a brake associated with at least one of said wheels, and
means operatively connecting said bumper to actuate said brake when said bumper is pivoted by engagement with an obstacle.

10. The combination set forth in claim 9 wherein said last mentioned means comprises a rod mounted for reciprocating movement on said body,
an operating crank pivoted to said body and to said rod,
said bumper having an extension adapted to engage and rotate said crank upon pivotal movement of said bumper due to engagement with an obstacle.

11. The combination set forth in claim 3 wherein said link comprises an opening therein which is elongated in a direction longitudinally of the body,
said portion of said tow pin engaging said link comprising a collar on said tow pin.

12. The combination set forth in claim 11 wherein the sides of said opening engaged by said collar extend downwardly and inwardly,
the contacting portions of said collar having generally complementary downwardly and inwardly extending surfaces.

13. In a tow truck, the combination comprising
a body adapted to be moved along a floor or the like,
a tow pin,
said tow pin being mounted for generally vertical reciprocation on said body,
at least the lower end of said tow pin being movable longitudinally of said body,
a bumper,
means for pivoting said bumper on said body, and
means between said bumper and said body operable upon pivotal movement of said bumper to elevate said tow pin while permitting longitudinal movement of the lower end of said tow pin,
said last mentioned means being operable to elevate the tow pin to a predetermined position after which additional movement of the bumper does not elevate the tow pin,
said truck including a rearwardly extending portion adapted to engage the underside of the bumper of a succeeding tow truck to hold said bumper in its pivoted position elevating said tow pin until the tow truck has moved away from said succeeding tow truck.

14. In a tow truck, the combination comprising
a body adapted to be moved along a floor or the like,
a tow pin,
said tow pin being mounted for generally vertical reciprocation on said body,
at least the lower end of said tow pin being movable longitudinally of said body,
a bumper,
means for pivoting said bumper on said body, and
means between said bumper and said body operable upon pivotal movement of said bumper to elevate said tow pin while permitting longitudinal movement of the lower end of said tow pin,
said last mentioned means being operable to elevate the tow pin to a predetermined position after which additional movement of the bumper does not elevate the tow pin,
shock absorbing means associated with said tow pin for yieldingly resisting said longitudinal movement of said tow pin.

15. In a tow truck, the combination comprising
a body adapted to be moved along a floor or the like,
a tow pin,
said tow pin being mounted for generally vertical reciprocation on said body,
at least the lower end of said tow pin being movable longitudinally of said body,
a bumper,
means for pivoting said bumper on said body, and
means between said bumper and said body operable upon pivotal movement of said bumper to elevate said tow pin while permitting longitudinal movement of the lower end of said tow pin,
said last mentioned means being operable to elevate the tow pin to a predetermined position after which additional movement of the bumper does not elevate the tow pin,
wheels on said body,
a brake associated with at least one of said wheels, and
means operatively connecting said bumper to said brake to actuate said brake when said bumper is pivoted by engagement with an obstacle.

16. The combination set forth in claim 15 wherein said last mentioned means comprises a rod mounted for reciprocating movement on said body,
an operating crank pivoted to said body and to said rod,
said bumper having an extension adapted to engage and rotate said crank upon pivotal movement of said bumper due to engagement with an obstacle.

References Cited

UNITED STATES PATENTS

| | | | |
|---|---|---|---|
| 3,015,284 | 1/1962 | Klamp | 104—172 |
| 3,103,895 | 9/1963 | Bradt | 104—172 |
| 3,119,347 | 1/1964 | Dehne | 104—172 |
| 3,357,367 | 12/1967 | Etheridge | 104—172 |

ARTHUR L. LA POINT, Primary Examiner

C. B. LYON, Assistant Examiner

U.S. Cl. X.R.

104—178